July 31, 1951 S. H. LIFTON 2,562,499
METHOD OF MAKING COMPOUND BRIEF CASES
Filed March 5, 1948 5 Sheets-Sheet 1

INVENTOR
Samuel H. Lifton
BY
ATTORNEY

July 31, 1951 S. H. LIFTON 2,562,499
METHOD OF MAKING COMPOUND BRIEF CASES
Filed March 5, 1948 5 Sheets-Sheet 2
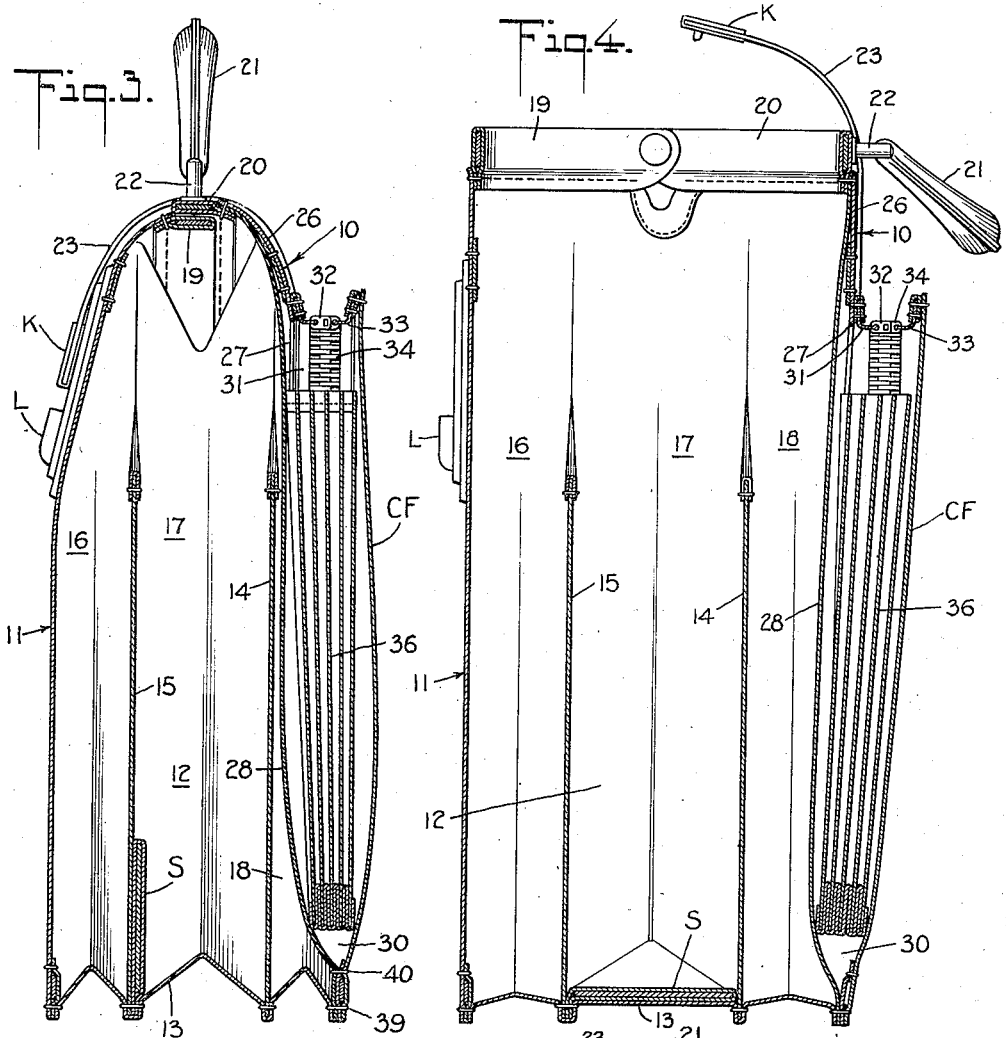
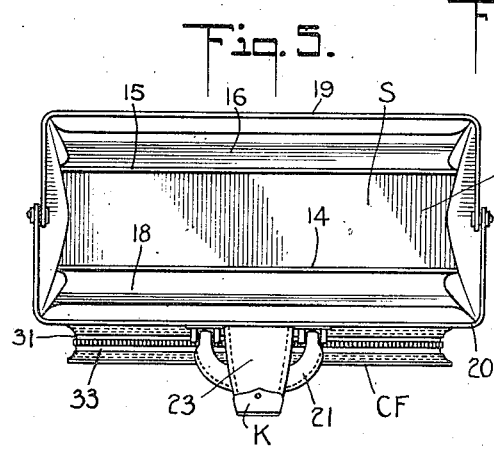
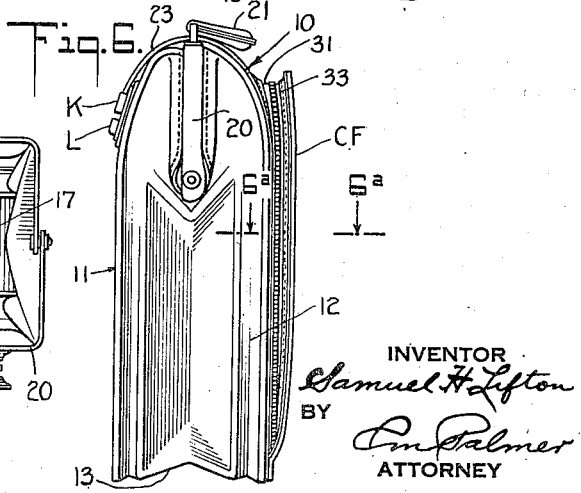
INVENTOR
Samuel H. Lifton
BY
Cm Palmer
ATTORNEY July 31, 1951  S. H. LIFTON  2,562,499
METHOD OF MAKING COMPOUND BRIEF CASES
Filed March 5, 1948  5 Sheets-Sheet 3
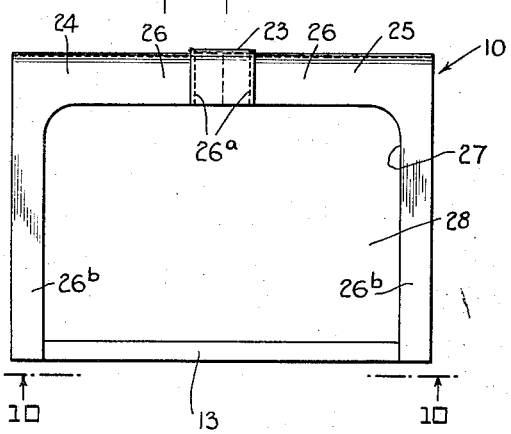
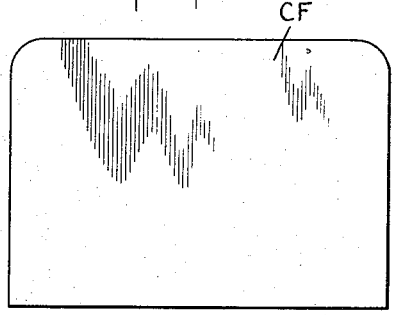
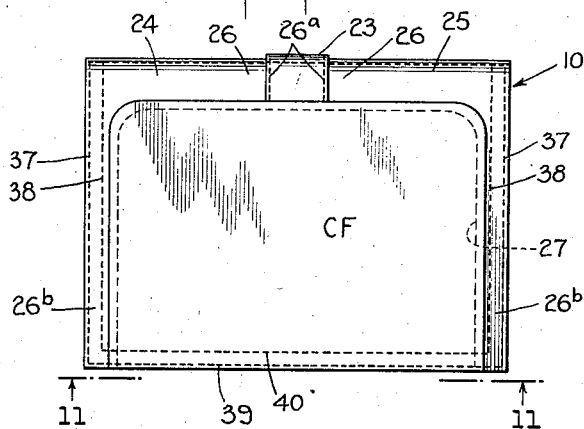
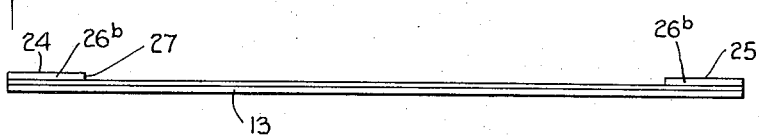
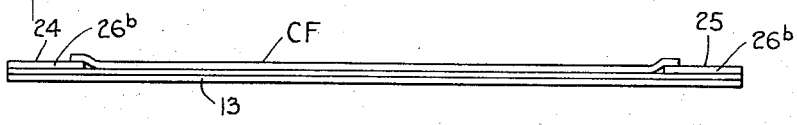
INVENTOR
Samuel H. Lifton
BY
Em Palmer
ATTORNEY

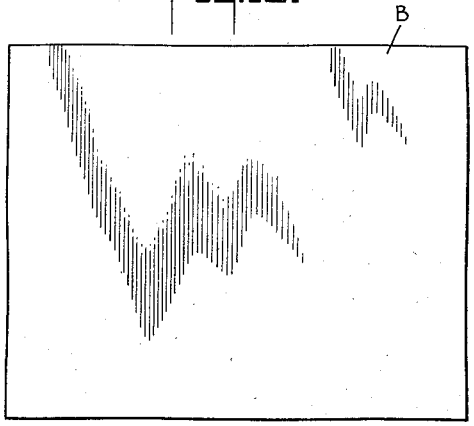
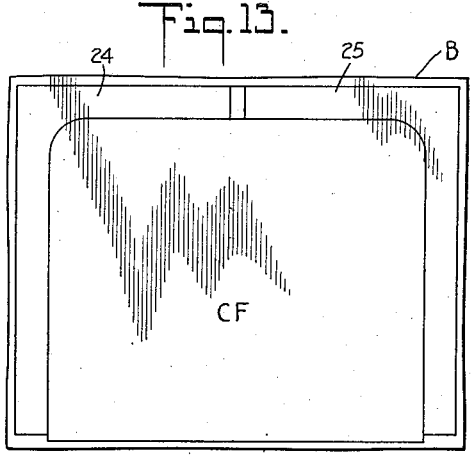
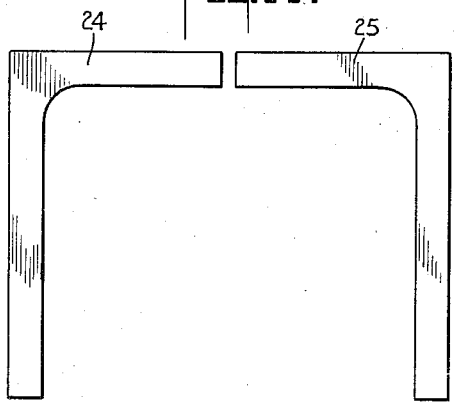
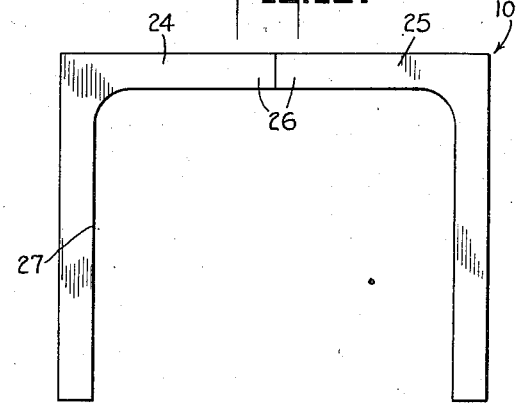
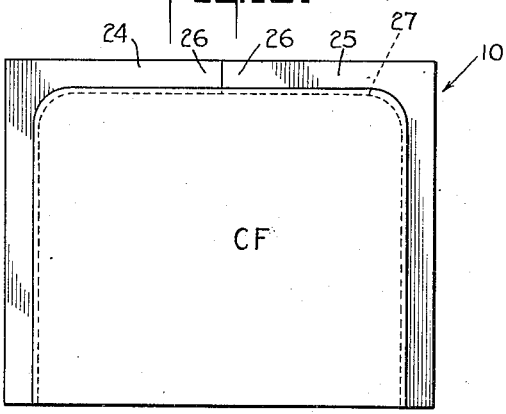
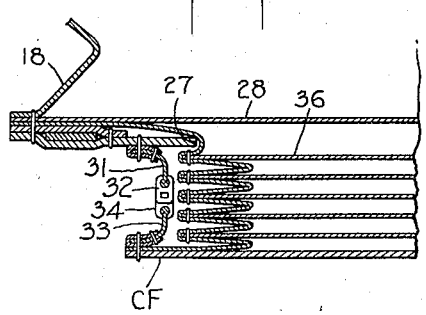

July 31, 1951     S. H. LIFTON     2,562,499
METHOD OF MAKING COMPOUND BRIEF CASES
Filed March 5, 1948     5 Sheets-Sheet 5
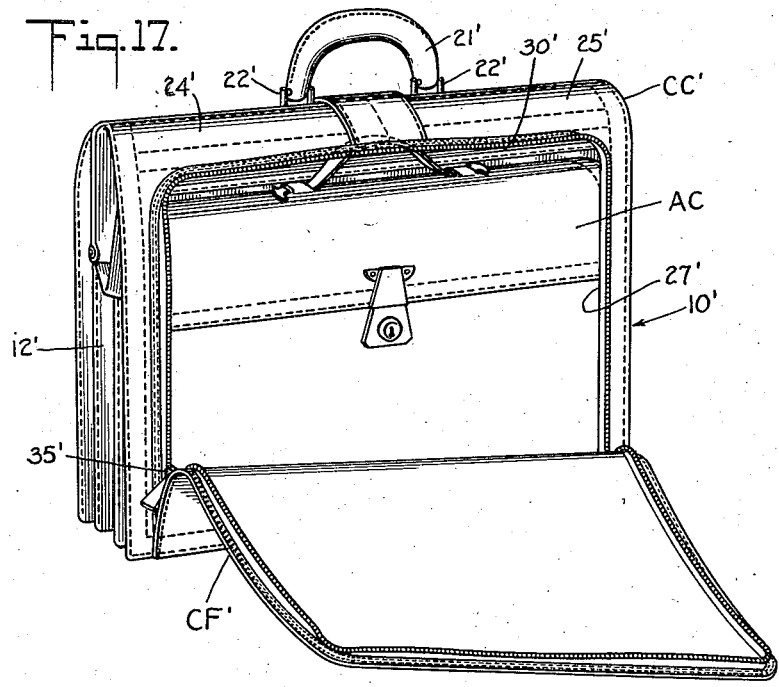
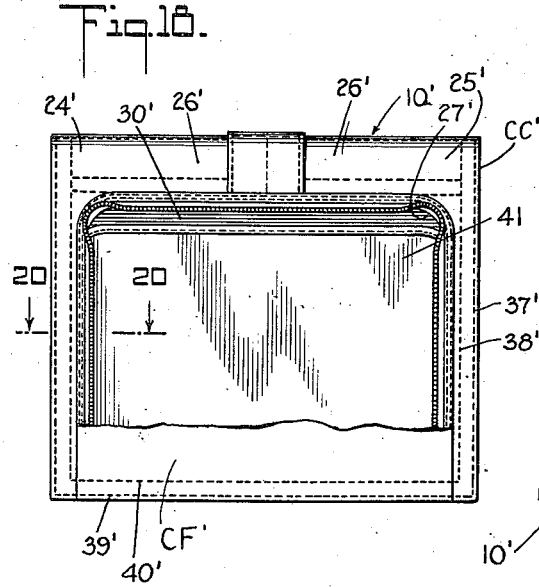
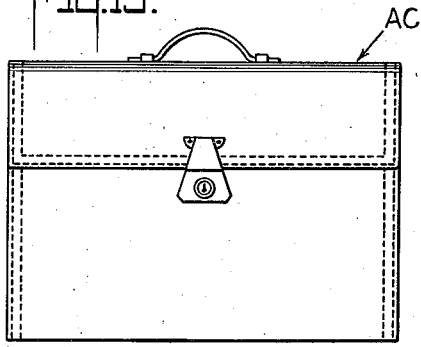
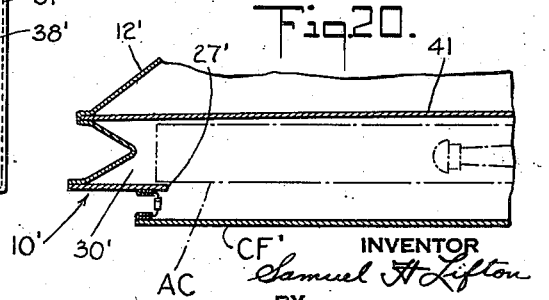

Patented July 31, 1951

2,562,499

UNITED STATES PATENT OFFICE 2,562,499

METHOD OF MAKING COMPOUND BRIEF CASES

Samuel H. Lifton, New York, N. Y.

Application March 5, 1948, Serial No. 13,107

4 Claims. (Cl. 150—1.6)

This invention is a functionally and structurally improved compound brief case having a plurality of conveniently accessible compartments advantageously adapted to receive and appropriately sustain various types of articles. Specifically the invention comprehends a new method of making a compound brief case particularly suitable for carrying appropriate records or even a supplementary brief case. More particularly the invention deals with distinctive and important improvements over the combined brief and overnight case disclosed in my United States Letters Patent 2,418,589, issued April 8, 1947, wherein the closure flap is appreciably spaced from the panel constituting an outer wall although integral with the lower margin of the latter. In Letters Patent above alluded to the closure flap is also substantially coplanar with the panel and detachably associated therewith by companion strings of slide fasteners having their fabric tapes or webs covering the gap formed by the panel and closure flap. Where the closure flap is secured to the panel by the companion strings of slide fasteners as shown in aforesaid Letters Patent, as a practical matter, it is difficult to apply or attach the strings of slide fasteners to these members in that the fabric tapes of the strings must be arranged and applied to be substantially parallel to the panel and closure flap. Moreover the fabric tapes of the strings of slide fasteners being at all times fully exposed are inadequate to keep out moisture from the interior of the brief case. Thus a primary object of the invention is realized in the provision of adequate overlap between the front panel and closure flap whereby the tapes of the strings of slide fasteners may be arranged and held substantially normal to the margins of these members or appreciably offset out of the planes thereof to provide for desired opening and closing of a suitable expandible and contractible gusset interconnecting the panel and closure flap. Another important object is a novel method of making the compound brief case and more particularly in forming one outer wall thereof from blank stock cut to provide both the panel and closure flap nevertheless permitting both of the latter to be arranged in the desired overlapping relation to provide for easy attachment of the tapes carrying the strings of slide fasteners. Specifically another object deals with a simplified method wherein a blank of leather stock is cut to form spaced elbows each having a horizontal reach and a depending limb and concomitantly forming a flap intervening the spaced limbs and thereafter positioning the ends of the reaches in end to end or juxtapositioned relation to constitute with the limbs an opening after which the flap is secured to overlap the lower margins of the reaches and the inner margins of the limbs. Other salient functional and structural features of the invention will appear from the following detailed description taken with the accompanying drawings wherein:

Fig. 3 is a vertical and transverse sectional view taken approximately on the line 3—3 of Fig. 1, however, illustrating the swingable spreader raised.

Fig. 4 is a view similar to Fig. 3 but showing the brief case expanded by the swingable spreader now in a horizontal position.

Fig. 5 is a plan view of Fig. 4 on a smaller scale.

Fig. 6 is an end view of Fig. 1.

Fig. 6a is a transverse sectional view on the line 6a—6a of Fig. 6.

Fig. 7 is a vertical or elevational view of one of the panels prior to completely securing thereof to the companion gusset.

Fig. 8 is an elevational view of the closure flap.

Fig. 9 shows the closure flap arranged in overlapping relation with the panel of Fig. 7.

Fig. 10 is an enlarged bottom view on the line 10—10 of Fig. 7.

Fig. 11 is an enlarged bottom view on the line 11—11 of Fig. 9.

Fig. 12 is a plan view of the leather blank stock out of which the panel and closure flap are formed.

Fig. 13 shows the layout on the blank stock for the panel and closure flap.

Fig. 14 illustrates complementary members or elbows forming the panel but unassembled.

Fig. 15 shows complementary elbows of the panel in assembled juxtapositioned relation but unsecured.

Fig. 16 illustrates the overlapping relation of the closure flap relative to the companion elbows of the panel.

Fig. 17 illustrates in perspective another compound brief case according to the invention showing a smaller or adjunct brief case removably retained thereby.

Fig. 18 is a fragmentary elevational and broken view of Fig. 17.

Fig. 19 is an elevational view of the adjunct brief case, and

Fig. 20 is a transverse sectional view on the line 20—20 of Fig. 18.

Figure 1:
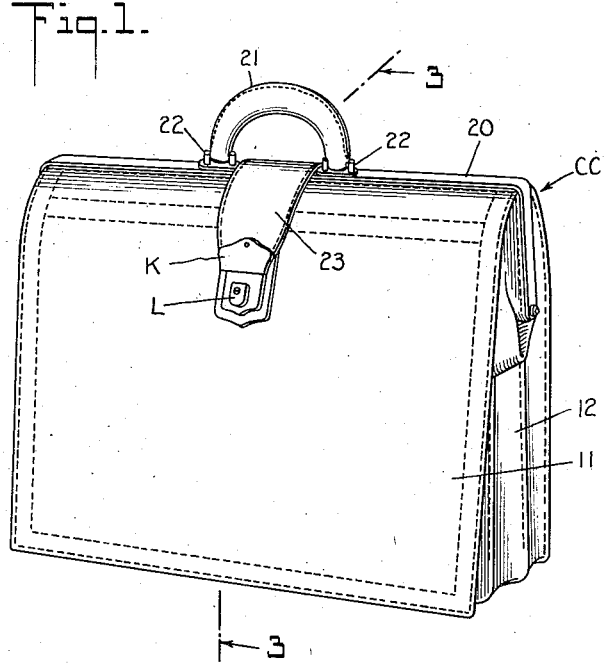
Fig. 1 is a perspective view of the compound brief case according to one embodiment of the invention.

Illustrative of the embodiments disclosed the compound brief case is generally denoted CC and is characterized by spaced panels 10 and 11 appropriately interconnected by the intervening expandible and contractible leather gusset 12 comprising bottom wall 13 which may be expanded by the swingable spreader S when shifted to the horizontal position illustrated in Fig. 4 at which time it cooperates with one of the baffles or partitions 14 which together with the spaced partition 15 divide the interior of the brief case into a plurality of compartments 16, 17 and 18. Covered metal reinforcing and swingably interconnected frames 19 and 20 are desirably secured to panels 10 and 11 and the intervening gusset 12. The handle 21 is swingably carried by posts 22 extending from frame 20. The lip 23 carrying keeper K is desirably fastened to panel 10. The construction so far described is well known in the art, except for lip 23 which as shown constitutes concealing and reinforcing means for the upper intermediate part of panel 10.

Referring now more particularly to panel 10, the latter is formed from the blank sheet of leather B (Fig. 12) on which the complementary members or inverted L-shaped elbows 24 and 25 (Fig. 13) defining panel 10 and the closure flap CF are laid out and cut. These complementary components or members are mounted along the side margins of the gusset 12 at which time inner ends or terminals of the horizontal reaches 26 thereof are disposed in meeting side by side or juxtapositioned relation as shown in Fig. 15. Thereafter the swinging lip or tongue 23 has one end secured thereto by the lines of stitching 26ᵃ to conceal and reinforce the contiguously disposed or abutting inner ends of the horizontal reaches 26 disconnected from and independent of each other.

Figure 2:
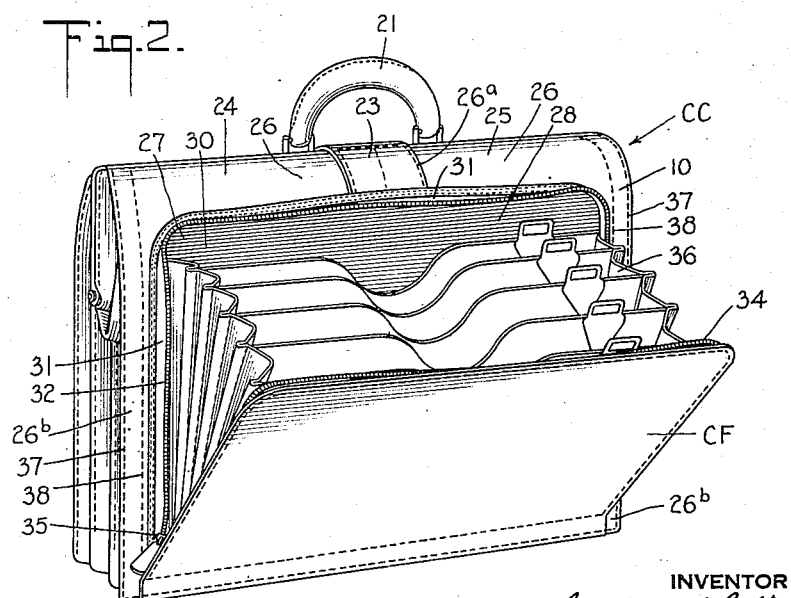
Fig. 2 is a perspective view of the other side of the brief case illustrating the closure flap open and the bellows file fully accessible.

The panel 10 constituted by the components 24 and 25 in fact characterizes one outer wall of the compound brief case and defines an inverted substantially U-shaped rim having the opening 27 (Fig. 15) disposed in front of the partition 28 (Figs. 2, 3 and 4) appropriately secured to the gusset 12 and to the panel 10 and coextensive with the width and length of the latter and defining with this panel the pocket 30.

Along the lower margin of the reaches 26 and along the inner margins of the depending limbs 26ᵇ of members 24 and 25 of panel 10 is appropriately secured the fabric tape or web 31 carrying the string of slide fastening elements 32 and secured to the side and upper margins of the closure flap CF is the fabric tape 33 carrying the string of slide fastening elements 34.

It will be observed that portions of tapes or webs 31 and 33 are primarily out of the planes of the panel 10 and closure flap and offset in part approximately normal thereto or in other words the slide fasteners 32 and 34 are also substantially normal to the closure flap and panel 10 and permitting the runner 35 to open and close fasteners 32 and 34.

With the present arrangement the runner is readily accessible and when actuated easily locks or unlocks the string of fasteners 32 and 34 and when the latter are interlocked closure flap CF precludes access to the compartment 30 in which the filing and classification bellows 36 is arranged. This bellows is desirably secured to the closure flap CF and the sides of front panel 10 and automatically expands when the closure flap is swung outwardly and automatically contracts when the closure flap is swung towards the panel 10.

Again calling attention to Fig. 13 it will be observed that the horizontal reaches of the elbows 24 and 25 have their inner ends spaced apart by the rectangular shaped intervenor or insert when the blank B is cut at which time the span or separation defined by spaced depending limbs is commensurate with the length of the flap CF at which time also the lower margin of this flap projects beyond the lower margins of the spaced vertical limbs of the elbows (Fig. 13). By this method the elbows 24 and 25 are completely spaced apart (Figs. 13 and 14) whereby the span, spread or separation therebetween is larger than the opening formed thereby after removal of the rectangular shaped intervenor and subsequent positioning or bringing together of the inner ends of the horizontal reaches 26 in close juxtaposition or contiguous relation or in other words, with the insert or intervenor and the flap removed from between the elbows and the latter brought together in abutting or contiguous relation (Fig. 15), the opening now formed by the elbows is reduced or less in size than their original separation by the intervening flap thereby permitting this flap when mounted on the brought together elbows to overlap the lower margins of the horizontal reaches and the side margins of the depending limbs and have its lower marginal portion thereof in line with the lower margins of the limbs (Fig. 16).

Having positioned the complementary members 24 and 25 and the bellows 36, closure flap CF is adjusted relative to members 24 and 25 to overlap margins of the latter defining opening 27. Members 24 and 25 are secured to the sides of the gusset 12 by the lines of stitching 37 and 38 and the lower margin of flap CF is secured to the bottom wall 13 of the gusset by the lines of stitching 39 and 40.

Briefly recapitulating, by the novel method herein of forming the juxtapositioned complementary members or elbows 24 and 25 and the closure flap CF out of the same blank and thereafter utilizing these members in overlapping relation, not only may the strings of slide fasteners be quickly attached thereto, but the resultant arrangement provides a commercially more acceptable and attractive item which is easily operated when desired concomitantly having a relatively minimum tape exposed area.

In the form according to Figs. 17 to 20 an adjunct brief case AC is removably retained in compartment 30' defined by panel 10' and a baffle 41 secured to bellows 12'. Unlike baffle 28 of Fig. 4, baffle 41 in Fig. 18 does not extend the entire height of the compartment 30'. In other aspects the form shown in Figs. 17 to 20 is along the lines of Figs. 1–16 and in Figs. 17 to 20, corresponding features found in Figs. 1–16 have been primed. In Figs. 17 to 20, the reaches and limbs of panel 10' preclude the adjunct brief case from accidentally falling out to the compartment 30, when the flap CF' is unlocked and swung downwardly.

In all the forms disclosed the lower free ends of the depending limbs 26ᵇ define an open span bridged by the lower marginal portion of the closure flap CF which may be said to intervene the lower free ends of limbs 26ᵇ but it should be observed that the closure flap also overlaps these limbs (Fig. 11).

With the present invention substantially all of the blank of leather stock is utilized and very little waste results and in addition it is possible to obtain the required overlap between the panel and closure flap, thus providing as previously mentioned an arrangement wherein the strings of fasteners may be easily applied, and thereafter easily operated, and concomitantly providing a compound brief case that is more attractive to the eye and from actual practice commercially more acceptable and of course in all of the forms disclosed the keeper K is desirably locked by the latching means as L.

Various changes may be made in details of construction and arrangement of parts without departing from the spirit of the invention or sacrificing any of the advantages thereof inherent therein.

I claim:

1. The herein described method of making an outer wall of a brief case, which comprises; cutting a blank to form a pair of inverted substantially L-shaped elbows embodying reaches having their inner facing ends spaced apart and each of said elbows embodying a limb depending from an outer marginal portion thereof and concomitantly forming a flap spanning said limbs and disposed below and contiguously to said reaches to provide an appreciable separation between said limbs, completely removing said elbows and flap from said blank, bringing said elbows together to arrange said inner facing ends of said reaches in juxtaposition to constitute with said limbs an opening smaller than said separation, securing said juxtapositioned ends, positioning said flap on said elbows to cover said opening and to overlap the lower margins of said reaches and the inner margins of said limbs, and fastening complementary disconnectable means to the side and upper margins of said flap and to said inner and lower margins of said elbows.

2. The herein described method of making an outer wall of a brief case, which comprises; cutting a blank to form a pair of inverted substantially L-shaped elbows embodying horizontally aligned reaches having their inner facing ends spaced apart and each of said elbows embodying a limb vertically depending from an outer marginal portion thereof and concomitantly forming a flap spanning said limbs and disposed below and contiguously to said reaches to provide an appreciable separation between said limbs and having a lower marginal portion projecting beyond said limbs, completely removing said elbows and flap from said blank, positioning said elbows to arrange said inner facing ends of said reaches in horizontal alinement and juxtaposition to constitute with said limbs an opening smaller than said separation, securing said facing and juxtapositioned inner ends in said horizontal alignment, mounting said flap on said elbows to cover said opening and to overlap the lower margins of said reaches and the inner margins of said limbs, and fastening complementary disconnectable means to the side and upper margins of said flap and to said inner and lower margins of said elbows.

3. The herein described method of making an outer wall of a brief case, which comprises; cutting a blank to form a pair of inverted substantially L-shaped elbows embodying horizontal aligned reaches having their inner facing ends spaced apart and each of said elbows embodying a limb vertically depending from an outer marginal portion thereof and concomitantly forming a flap spanning said limbs and disposed below and contiguously to said reaches to provide an appreciable separation between said limbs and having a lower marginal portion projecting beyond said limbs, completely removing said elbows and flap from said blank, bringing said elbows together to arrange said inner facing ends of said reaches in horizontal alinement and juxtaposition to constitute with said limbs an opening smaller than said separation, securing said juxtapositioned ends in said horizontal alignment, mounting said flap on said elbows to arrange said lower marginal portion in line with the lower margins of said limbs and to cover said opening and to overlap the lower margins of said reaches and the inner margins of said limbs, and fastening complementary disconnectable means to the side and upper margins of said flap and to said inner and lower margins of said elbows.

4. The herein described method of making an outer wall of a brief case, which comprises; cutting a blank to form an inverted U-shaped member and a flap within said member, removing an intermediate part of the bridge of said U-shaped member leaving a pair of inverted substantially L-shaped elbows each having a reach and a depending limb, removing said flap from between said elbows to leave an opening, moving said elbows together with the inner ends of said reaches in juxtaposition thereby reducing the size of said opening, securing said juxtapositioned ends, mounting said flap on said elbows to cover said reduced opening and to overlap the lower margins of said reaches and the inner margins of said limbs, and disconnectably securing said elbows and flap together.

SAMUEL H. LIFTON.

REFERENCES CITED

The following references are of record in the file of this patent:

UNITED STATES PATENTS

| Number | Name | Date |
|--------|------|------|
| 359,150 | Hagelberg | Mar. 8, 1887 |
| 1,367,574 | White | Feb. 8, 1921 |
| 1,683,029 | Fanger | Sept. 4, 1928 |
| 2,011,879 | Stein | Aug. 20, 1935 |
| 2,053,630 | Plotkin | Sept. 8, 1936 |
| 2,247,320 | Stanley | June 24, 1947 |
| 2,288,867 | Meyer et al. | July 7, 1942 |
| 2,316,328 | Guenther et al. | Apr. 13, 1943 |
| 2,405,361 | Langford et al. | Aug. 6, 1946 |
| 2,418,589 | Lifton | Apr. 8, 1947 |
| 2,438,780 | Hochner | Mar. 30, 1948 |

FOREIGN PATENTS

| Number | Country | Date |
|--------|---------|------|
| 345,808 | Great Britain | Apr. 2, 1931 |